(12) United States Patent
Altman

(10) Patent No.: US 7,535,202 B2
(45) Date of Patent: May 19, 2009

(54) ADJUSTABLE INPUT PULSATION DEVICE

(75) Inventor: Roger Altman, Ellisburg, NY (US)

(73) Assignee: Canadus Power Systems, LLC, Warrensville Heights, OH (US)

( * ) Notice: Subject to any disclaimer, the term of this patent is extended or adjusted under 35 U.S.C. 154(b) by 237 days.

(21) Appl. No.: 11/732,287

(22) Filed: Apr. 3, 2007

(65) Prior Publication Data
US 2008/0246440 A1  Oct. 9, 2008

(51) Int. Cl.
*H02J 7/04* (2006.01)
(52) U.S. Cl. .................................................. 320/139
(58) Field of Classification Search ............. 320/137, 320/139–146, 162
See application file for complete search history.

(56) References Cited

U.S. PATENT DOCUMENTS

| | | | |
|---|---|---|---|
| 5,633,575 A | 5/1997 | Gali | |
| 5,648,714 A | 7/1997 | Eryou et al. | |
| 5,739,672 A * | 4/1998 | Lane | 320/139 |
| 5,945,811 A * | 8/1999 | Hasegawa et al. | 320/141 |
| 6,232,750 B1 * | 5/2001 | Podrazhansky et al. | 320/139 |
| 7,474,078 B2 * | 1/2009 | Baker | 320/134 |
| 2003/0094927 A1 | 5/2003 | Pavlovic et al. | |

OTHER PUBLICATIONS

PCT, International Search Report and Written Opinion issued regarding PCT/US2008/058982 (Aug. 1, 2008).

* cited by examiner

*Primary Examiner*—Akm E Ullah
*Assistant Examiner*—Ramy Ramadan
(74) *Attorney, Agent, or Firm*—Thompson Hine LLP

(57) ABSTRACT

A battery pulsation system including a battery having a plurality of cells and a pulsation device connected to the battery to supply a pulsation energy to the plurality of cells, the pulsation energy having a pulsation amplitude and a pulsation frequency, wherein the pulsation device is adapted to control the pulsation amplitude of the pulsation energy.

7 Claims, 2 Drawing Sheets

ADJUSTABLE INPUT PULSATION DEVICE

BACKGROUND

The present application is directed to the art of battery charging and, more particularly, to systems and methods for charging and pulsating batteries.

Various deposits, such as lead sulfate deposits, often are generated as byproducts of the electro-chemical reaction that takes place when a battery is discharged. The accumulation of such deposits within the battery may degrade the operation of the battery and, if sufficient accumulation is present, may reduce current flow to unacceptable levels.

Pulsation devices have been developed to counteract the accumulation of such deposits by applying pulsation energy, such as radio frequency energy, to the battery. Without being limited to any particular theory, one of which is described immediately below, it is believed that pulsation energy breaks down the accumulated deposits and facilitates ionic current flow between battery plates.

Accordingly, there is a need for a system and method for pulsating batteries, while limiting undesired side effects.

SUMMARY

In one aspect, a battery pulsation system may include a battery having a plurality of cells and a pulsation device connected to the battery to supply pulsation energy to the plurality of cells, the pulsation energy having a pulsation amplitude and a pulsation frequency, wherein the pulsation device is adapted to control the pulsation amplitude of the pulsation energy.

In another aspect, a battery pulsation system may include a battery having a plurality of cells, a pulsation device connected to the battery to supply a pulsation energy to the plurality of cells, the pulsation energy having a pulsation amplitude and a pulsation frequency, wherein the pulsation device includes a control circuit, and a sensor connected to the battery and in communication with the control circuit, the sensor generating sensor signals, wherein the control circuit is adapted to control the pulsation amplitude of the pulsation energy based upon the sensor signals.

Other aspects of the disclosed adjustable input pulsation device and associated battery pulsation systems will become apparent from the following description, the accompanying drawings and the appended claims.

DETAILED DESCRIPTION

Figure 1:
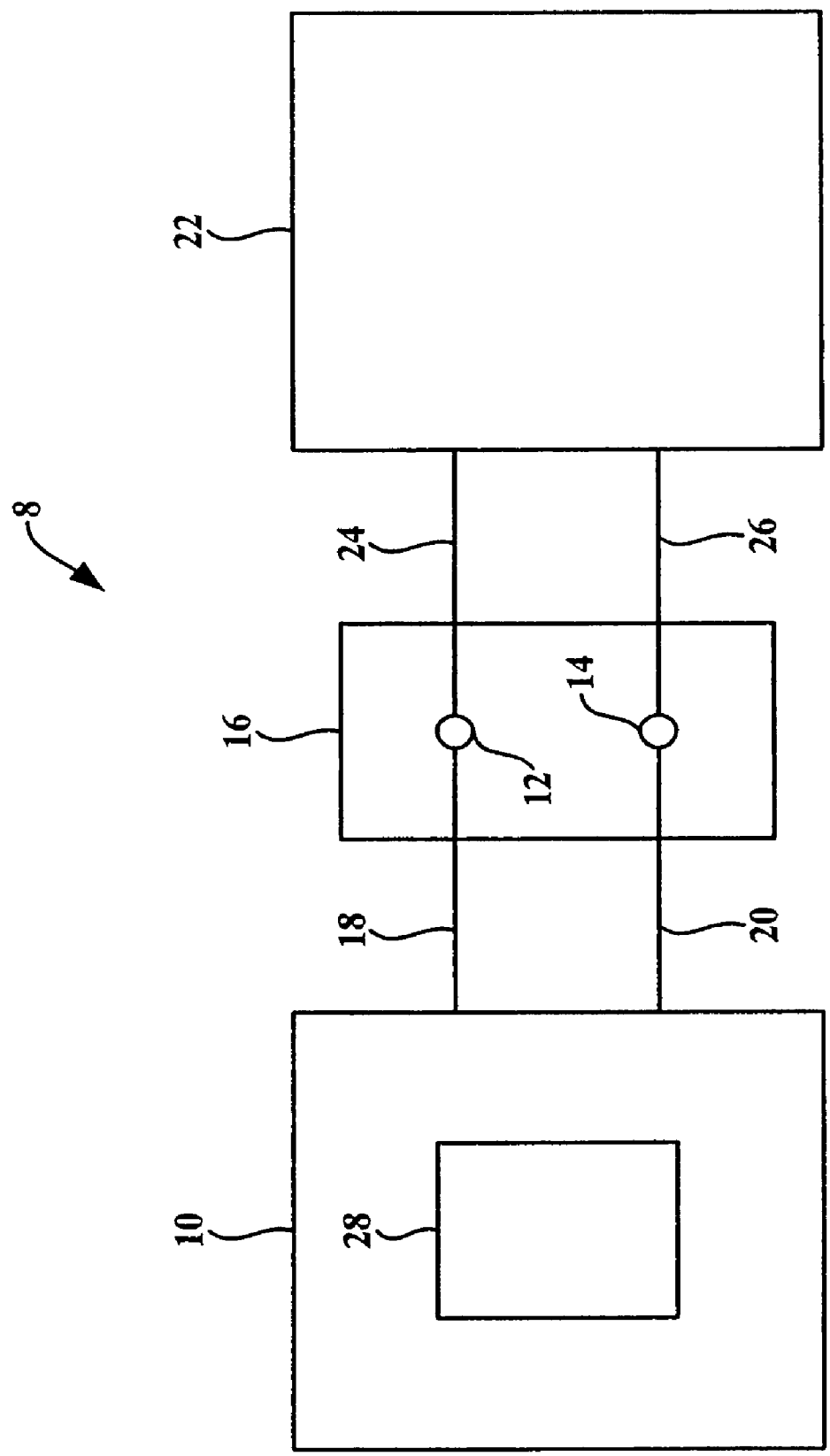
FIG. 1 is a block diagram of one aspect of the disclosed battery charging and pulsating system.

Referring to FIG. 1, a battery charging and pulsating system, generally designated 8, may include an adjustable input pulsation device 10, a battery 16 and a charger 22. The battery 16 may include positive 12 and negative 14 terminals and a plurality of cells (not shown). The adjustable input pulsation device 10 may be connected to the positive 12 negative 14 terminals of a battery 16 by leads 18, 20. The battery charger 22 may be connected, in parallel, to the positive 12 and negative 14 terminals of the battery 16 by leads 24, 26.

The pulsation device 10 may include control circuitry 28 adapted to facilitate the generation and communication of pulsation energy, such as radio frequency ("RF") energy, to the battery 16. Circuitry 28 may be a processor, a control unit (e.g., an electronic control unit) or the like. The circuitry 28 of the pulsation device 10 may control the amplitude of the pulsation energy being supplied to the battery 16.

The pulsation energy may be used to prevent small crystals formed in the battery 16 during battery discharge from growing into larger, "hard" (meaning hard to decompose) crystals. The pulsation energy, such as radio frequency energy, is essential to prevent micro-crystalline discharge products (formed during battery discharge) from growing into large "hard crystals" which, when formed, do not participate in electrochemical recharge reactions. It is almost certain that this energy is not directly responsible for preventing crystal growth because, in an aqueous medium, such as battery acid, surface free energy variations will alter local or boundary layer lead sulfate solubility product, and, thus, will dictate where discharge products will precipitate as micro-crystals and where they will re-dissolve into the electrolyte.

A typical mechanism for crystal growth begins with a thermodynamic driving force to reduce crystal surface free energy by reducing a crystal's surface to mass ratio, i.e., by increasing crystal size. The greater surface free energy of micro-crystals increases the solubility of the discharge products in the electrolyte. Any larger particle at the same temperature will have a lower surface free energy, creating a slightly lower solubility in the aqueous boundary layer surrounding it. Thus, a pathway is created to dissolve discharge products from smaller crystals and deposit these ions onto larger crystals. As this process continues, large or "hard crystals" are formed over time.

When micro-crystals are bombarded with pulsation energy, such as radiofrequency energy, at a frequency that is absorbed by the crystalline discharge product, the temperature of the larger crystals rises more than that of smaller crystals because their smaller surface to mass ratio is less effective in transferring heat to the surroundings. Since the solubility product increases exponentially with a rise in temperature, even a slightly greater temperature on the surface of the larger particles will measurably increase solubility in the boundary layer and offset the intrinsically lower surface free energy of these larger particles. Thus, pulsation energy counteracts the natural tendency for smaller crystals to grow into larger crystals, stabilizing micro-crystals indefinitely so that, if frequency and amplitude are in the proper range, these particles will be small enough to break-down into battery reactants when these crystals receive charging current from the grid.

Crystal size may be related to crystal surface area and crystal mass. When all crystals are bombarded with pulsation energy at a frequency that may be absorbed by the crystals, the temperature of the larger crystals that have formed prior to the introduction of RF energy, may rise more than the temperature of smaller crystals. Larger crystals may be unable to dissipate all of this absorbed energy and, as a result, temperature can reach a point that decomposes the crystal, thereby shattering the larger crystals into smaller crystals.

The frequency of the pulsation energy supplied to the battery 16 by the pulsation device 10 may be manipulated by the circuitry 28 of the pulsation device 10. For example, the frequency of the pulsation device may be maintained at or above 10 kilohertz for lead acid batteries, which may be equivalent to a radio frequency of 500 kilohertz after taking into account that 99% of the pulse generation time can be dead-time. Frequencies in this range may create a pulse time-decay that can be several orders of magnitude smaller than the time it takes to nucleate hydrogen and oxygen gas bubbles formed during the latter stages of charging a lead acid battery. Such a rapid energy pulse and decay is, therefore, not additive or perceivable to the EMF that drives the electrochemical charging reactions. However, such pulsation energy may be at a wavelength that produces heat in solid materials because of the friction generated when the rigidly held atoms of a solid material vibrate as they resonate within this range of radio frequencies. The pulsation energy wavelength required to retard crystal growth will depend on the actual composition of the crystal discharge product. Fine tuning the pulsation device 10 to those frequencies that resonate with specific electrochemical cell discharge products will optimize the efficiency of hard crystal control and removal.

Furthermore, the amplitude of the pulsation energy supplied to the battery 16 by the pulsation device 10 may be manipulated by the circuitry 28 of the pulsation device 10. Studies have shown that a lower standard deviation of cell open circuit voltage ("SOCV") may translate into greater battery capacity and longevity. The SOCV of the battery 16 may be reduced by properly controlling the amplitude of the pulsation energy supplied to the battery 16. In one aspect, the circuitry 28 of the pulsation device 10 may control the amplitude of the pulsation energy based upon the number of cells in the battery 16 and/or the cell amp-hour rating, thereby maintaining the capacity of relatively new batteries and upgrading the capacity of older batteries.

If the amplitude of the pulse can be sufficiently high, and hard crystals are present, the pulsation energy may raise the internal temperature of larger crystals to the point at which they begin to decompose. In fact, SEM photomicrographs show blow holes in lead sulfate crystals after exposure to a pulsation device. This pulsation energy is strong enough to create temperatures high enough to begin decomposing the crystal. The resulting rapid rise in crystal vapor pressure eventually causes an explosive release of compressed gases, removing a significant portion of the lead sulfate crystals from plate surfaces. When such an event occurs, fresh plate surface can be exposed so that additional electrochemical mass transfer can proceed. Thus, by controlling the amplitude of the pulsation energy, one can control hard crystal formation at a low energy output and, at a much higher amplitude, expose fresh plate surface by decomposing already formed large crystals.

Thus, the amplitude of the pulsation energy may be controlled such that high amplitude pulsation energy is used to desulfate severely sulfated batteries and low amplitude pulsation energy is used to maintain new and existing batteries 16 free of hard crystals. Furthermore, low amplitude pulsation energy may be used when stray signals (e.g., RF noise) cannot be tolerated.

In one aspect, the adjustable input pulsation device 10 may operate in three different modes. First, the amplitude of the pulsation energy may be increased to a relatively high output. The increased amplitude may be used to remove already-formed hard sulfate present in older batteries never exposed to a pulsation device 16. The high amplitude operating mode may require frequent equalization such that the SOCV does not rise to levels that effect battery performance and longevity. Second, the amplitude of the pulsation energy may be reduced to a relatively low output. The reduced amplitude may be used after hard crystals have been removed from older batteries or when pulsing new batteries. The reduced amplitude mode may provide just enough pulsation energy to prevent micro-crystals from growing together and forming large "hard" crystals. Furthermore, the reduced amplitude mode may prevent too many "hard crystals" from decomposing to avoid the need for frequent equalization in order to maintain a low SOCV. Third, the amplitude of the pulsation energy may be a variable amplitude pulsation energy. For example, the amplitude of the pulsation energy may be controlled (e.g., by circuitry 28) based upon various input signals, such as the specific gravity of the electrolyte in the battery 16 (see below), the measured SOCV and the measured battery resistance. A feedback loop or the like may be used to accomplish the amplitude control.

At this point, those skilled in the art will appreciate that the control of the amplitude of the pulsation energy, as discussed above, may be performed either manually or automatically.

In one aspect, manual control of the adjustable amplitude pulsation device 10 may be achieved by noting changes in acid specific gravity, as discussed below. Aside from water loss, specific gravity may rise because the device 10 decomposes a portion of the hard lead sulfate into lead oxide, oxygen and sulfur dioxide. The sulfur dioxide gas released, dissolves in the acid and reacts with water to form sulfurous acid. As soon as the battery goes back on charge, the half cell voltage (~1.1 volts) easily exceeds the anodic potential required to oxidize sulfurous to sulfuric acid ($E°=-0.1576$ volts).

Manually adjustable, pulsation device tuning can be controlled by noting changes in acid specific gravity in lead-acid batteries. Aside from water loss, specific gravity can rise in these batteries by electrochemically decomposing micro-crystalline lead sulfate. Selecting a strong, initial pulse to remove the hard crystalline sulfate protective cover, may allow any underlying micro-crystalline lead sulfate to intermingle with the bulk acid and react electrochemically with the grid when exposed to a charging current. Periodically tuning the amplitude of the pulsation energy to maximize the rate of acid production may also maximize the rate at which battery capacity may improve.

Changes in specific gravity may correlate with changes in battery performance and quantified using the equation:

$$\Delta PAHR=4.9676+0.21408\times\Delta SG$$

wherein $\Delta PAHR$ represents a change in the battery's percent amp-hour rating and $\Delta SG$ represents the "point" change in specific gravity. The equation was derived from fields test and is merely an example of any number of such correlations. The equation also suggests that battery capacity may improve by a few percentage points without a detectable rise in specific gravity. Note that $\Delta PAHR=4.97$ when $\Delta SG=0$. The reason for this behavior becomes apparent when one considers that battery capacity may be a function of the log of battery internal resistance. Therefore, a small reduction in battery internal resistance instigated, for example, by the pulsation device 10, may be undetectable by a standard 6-hour load test or even by a highly sensitive digital hydrometer that can measure changes in specific gravity down to ±0.001 units.

In another aspect, automatic control of the adjustable amplitude pulsation device 10 may be achieved by monitoring the battery electrically and controlling the amplitude of the pulsation energy to minimize a control parameter, such as single cell voltage drop of the battery 16. For this type of control, there are many ways to create an automatic feed-back system when a battery may be on-charge. In one example, the following steps may be performed:

1. Cell voltage drop data ("CVD") may be gathered from voltage sensors placed on individual cells in the battery 16;

2. The CVD data may be processed (e.g., by circuitry 28) to convert individual CVD values for the cells into a single value, SCVD, that quantifies cell variation for the entire battery 16;
3. The amplitude of the pulsation energy may be adjusted (e.g., continuously) by the circuitry 28 to minimize the SCVD. For example, an empirically derived regression equation obtained from field or bench scale experiments, may be used to determine the effect of the amplitude of the pulsation energy on SCVD.
4. The SCVD may be calculated in real time and reported continuously on a LED display and/or stored with a time stamp by a data logger or any other method of recording the data.

In another aspect, automatic control of the adjustable amplitude pulsation device 10 may be achieved by monitoring the battery 16 electrically and controlling the amplitude of the pulsation energy to minimize a controlled parameter, such as the ratio of the highest cell voltage drop to the average cell voltage drop of all the cells in the battery 16.

It is believed that an increase in electrical resistance of the battery 16 may be correlated to an increased accumulation of crystalline deposits. Therefore, in another aspect, automatic control of the adjustable amplitude pulsation device 10 may be achieved by monitoring the electrical resistance of the battery 16 with an appropriate sensor and, when the resistance exceeds a threshold value, or several predetermined values, the amplitude of the pulsation energy is increased by a corresponding amount.

Testing has confirmed that adjusting the amplitude of the pulsation energy supplied to a battery 16 by a pulsation device 10 may improve battery performance.

A first test was based on a 12-volt pulsation device that was fitted directly to the third battery of a 48-volt electric vehicle battery string. The 12-volt batteries that made up the 48-volt string were never equalized, yet most of these batteries achieved a higher capacity after a one year exposure to the pulsation device. Without being limited to any particular theory, it is believed that the string performance improved without periodic equalization because the amplitude of the pulsation energy delivered to each battery declined as its distance from the third battery increased. The basis for this logic may be that the third battery was the only battery to receive pulsation directly, over a very short length of wire.

If the amplitude of the pulsation energy is relatively low, it may still be powerful enough to prevent micro-crystals from growing together, but may not be strong enough to eliminate most of the already-formed hard crystalline deposit materials. Charge level and pulse energy may be strong enough throughout all of this battery's six cells to retard micro-crystals from growing together (because each cell reaches a full charge), and to eliminate a much greater percentage of the already-formed hard crystalline sulfate (due to the amplitude of the pulse energy). Destroying hard sulfate crystals exposes more plate surface to the electrochemical reactions. This explanation may be supported by the fact that the third battery had, by far, the greatest pulsation-related capacity improvement.

Under most circumstances, the greatest removal of hard deposits is accomplished using a high amplitude pulse. However, amplitude control based upon SOCV may be inadequate if equalization is too infrequent or not used at all, as in the case of golf cart batteries, for example. It may be much more practical to prevent hard sulfate from forming as the primary goal while removing some hard sulfate form individual cells as a way to control battery SOCV. Eliminating some hard crystalline sulfate still may be very important because virtually all initial pulsation applications will depend on successfully desulfating older batteries. These batteries are almost always partially sulfated, and they will probably fail eventually from a variety of problems that are caused directly and indirectly by excessive amounts of hard sulfate.

A second test was based upon a 128-volt, 20,000 pound, coal-hauler battery. In this example, battery life improved from about 17 to 33 percent after all 64 cells were exposed to a 120-volt pulsation device. Yet, as in the first example, such coal-hauler batteries were not equalized at the time the test data were obtained. Attacking already-formed hard crystalline sulfate in lead-acid batteries usually requires frequent equalization because, 24 through 48-volt forklift battery field measurements indicate that pulsation devices do not desulfate all cells at the same rate. SOCV will expand if pulse energy is particularly strong and the battery is not equalized frequently enough to allow gassing shear forces to remove partially detached hard sulfate crystals, whose attachment to the plates has been weakened by pulsation, and to allow all cells to reach a similar state of charge. Frequent equalization is needed to bring the charge levels of the weakest cells closer to that of the strongest cells so that the relativity large amount of hard sulfate on the weakest cells is eliminated faster than from the strongest cells. If this hard sulfate removal rate differential does not occur, SOCV will expand which leads to weak cell over-discharge and battery string deterioration and failure. The cause of this problem, as indicated by high SOCV values, may begin with weak cell undercharging which may cause the weakest cells to be over-discharged when the battery is operating under load. The phenomenon of over-discharge may cause battery plates to warp and overheat, and, in the extreme case, may cause cell polarity reversal which reduces negative plate surface area permanently. Each of these problems creates irreversible cell damage and can lead to the early demise of the entire battery.

Despite this potential complication when a battery is assisted by a pulsation device, the requirement to maintain frequent equalization may not always be required. For example, the immense size of the coal hauler batteries may be sufficient to use pulse energy to eliminate micro-crystalline grain growth while being insufficient to remove a large portion of the hard sulfate that has already formed. The following data support this view. Two, 128-volt mine batteries were pulsed with a 120-volt pulsation device from 41 to 52 days. If pulse amplitude is properly tuned to cell amp-hour rating and the number of cells that make up the battery, then there may be no difference in the overall amount of hard crystalline sulfate removed from the weak and the strong battery cells. However, removing some of the hard sulfate may be necessary to allow new plate surface to expose fresh electrochemical reactants. Often it may be possible to detect a rise in specific gravity as evidence that some hard sulfate has been removed from the plate surface, and fresh micro-crystalline lead sulfate has reacted and sulfur dioxide has formed additional acid. In these field tests, specific gravity improved by 24 and 32 points, where a point is 0.001 specific gravity units, which is equivalent to a rise in battery capacity of 10.1 and 11.8 percent respectively. Based on the field tests described above, a pulsation device could be fitted to lead-acid forklift, standby, and EV batteries that would both improve their performance and longevity, and significantly reduce the frequency of forklift battery equalization, or otherwise reduce periodic servicing, or replacement, in the case of standby and EV batteries.

In another example, a 24-volt battery was not exposed to pulsation energy and was not equalized for its entire 4½ year lifespan. To those knowledgeable about lift truck battery operations, equalization may be considered reasonably effective in slowing down the rate of sulfation, but may be almost totally ineffective in reversing sulfation once it has occurred.

Figure 2:
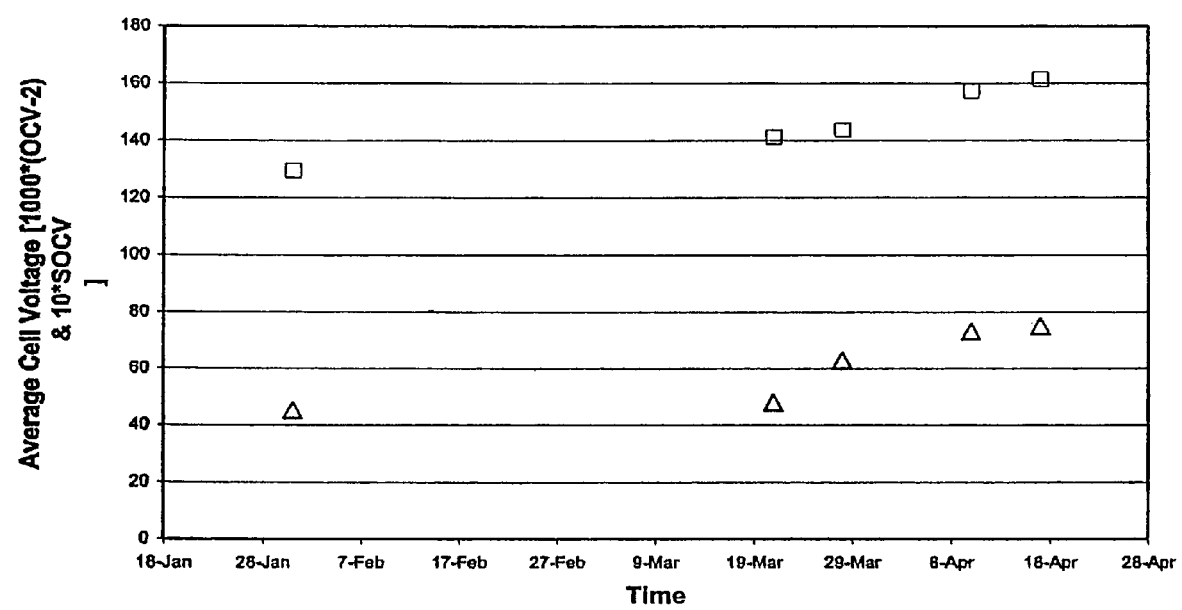
FIG. 2 is a graph of field measurement showing the effect of adjustable amplitude pulsation on battery health and performance.

Referring to FIG. 2, the graph shows field measurements of the cell voltage of a battery receiving pulsation energy from a pulsation device over time. This graph illustrates the influence of recent equalization on a 24-volt battery continuously exposed to a pulsation device for 4½ years, but never equalized during that time. The battery average cell open circuit rest voltage ("ROCV") changed from 2.130 volts before being exposed to equalization (prior to 21-March) to 2.161 volts on 17-April after weekly exposure to equalization for almost one month. Considering that a new battery exhibits an average cell voltage of only 2.145 volts, the 2.161 volts is a substantial improvement. Therefore, these results, support the disclosed theory that a pulsation device can prevent micro-crystalline lead sulfate grains from growing together, and, therefore, render them highly reactive when in this case exposed much later to an equalization voltage.

Accordingly, those skilled in the art will appreciate that adjusting the amplitude of the pulsation energy being supplied to a battery 16 by a pulsation device 10 in response to various conditions may reduce the standard deviation of cell open circuit voltage, SOCV, and may improve battery capacity and longevity.

Although various aspects of the disclosed adjustable input pulsation device have been shown and described, modifications may occur to those skilled in the art upon reading the specification. The present application includes such modifications and is limited only by the scope of the claims.

What is claimed is:

1. A battery pulsation system comprising:
    a battery having a plurality of cells, each of said plurality of cells having a cell open circuit voltage;
    a pulsation device connected to said battery to supply a pulsation energy to said plurality of cells of said battery, said pulsation energy having a pulsation amplitude and a pulsation frequency; and
    control circuitry configured to control said pulsation amplitude of said pulsation energy based upon a standard deviation value of said open circuit voltages,
    wherein said control circuitry controls said pulsation amplitude of said pulsation energy based upon input signals received from a plurality of sensors, said input signals being indicative of said standard deviation value.

2. The system of claim 1 wherein said battery is a lead acid battery.

3. The system of claim 1 further comprising a battery charger connected to said battery, wherein said battery charger and said pulsation device are connected in parallel.

4. The system of claim 1 wherein said control circuitry controls said pulsation amplitude of said pulsation energy based upon input signals received from a plurality of sensors, said input signals being indicative of said standard deviation.

5. The system of claim 1, wherein said plurality of sensors are voltage sensors connected to said plurality of cells of said battery and in communication with said control circuitry.

6. The system of claim 1 wherein said pulsation amplitude is increased when said standard deviation increases.

7. The system of claim 1 wherein said pulsation energy is directed to a select cell of said plurality of cells of said battery, said select cell having a larger voltage drop than the other cells of said plurality of cells.

* * * * *

UNITED STATES PATENT AND TRADEMARK OFFICE
CERTIFICATE OF CORRECTION

PATENT NO. : 7,535,202 B2  
APPLICATION NO. : 11/732287  
DATED : May 19, 2009  
INVENTOR(S) : Roger Altman Page 1 of 1

It is certified that error appears in the above-identified patent and that said Letters Patent is hereby corrected as shown below:

Claim 4, Col. 8, Lines 15-18, entire claim should be deleted.

Claim 5, Col. 8, Line 19, "5" should read -- 4 --.

Claim 6, Col. 8, Line 22, "6" should read -- 5 --.

Claim 7, Col. 8, Line 24, "7" should read -- 6 --.

Signed and Sealed this

Eleventh Day of August, 2009

David J. Kappos
*Director of the United States Patent and Trademark Office*